3,211,608
PIPERAZINO-SULFONAMIDES
Adrian Marxer, Muttenz, and Atso Ilvespaa, Neuall-
schwil, Switzerland, assignors to Ciba Corporation,
New York, N.Y., a corporation of Delaware
No Drawing. Filed Aug. 1, 1962, Ser. No. 213,892
Claims priority, application Switzerland, Aug. 9, 1961,
9,352/61
15 Claims. (Cl. 167—53)

The present invention relates to new sulfonamides. More especially it concerns 4-alkyl-piperazino-sulfonamides of the general formula

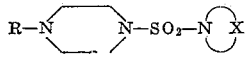

in which R represents an alkyl radical and X an alkylene radical which may be interrupted by an oxygen atom, and their salts. The alkyl radical R represents, for example, more especially a lower alkyl radical, such as methyl, ethyl, propyl or isopropyl, or a straight or branched butyl, pentyl or hexyl group which may be linked in any desired position. The alkylene radical which may be interrupted by oxygen forms, for example, together with the nitrogen atom a pyrrolidino, piperidino or morpholino group.

The invention provides above all piperazino-sulfonamides of the formula

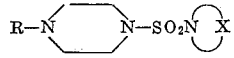

and their salts, where R represents an alkyl group with 1–4 carbon atoms, and X represents an alkylene or oxa-alkylene group with 4 or 5 chain members, more especially one of the groups butylene-(1:4), pentylene-(1:5), or 3-oxa-pentylene-(1:5).

The new compounds possess valuable pharmacological properties and are distinguished especially by their antiparasitary and anthelmintic effects. They are particularly active against filaria and lung worms and may accordingly be used pharmacologically or as medicaments.

Special mention deserve:

(4-methyl-piperazino)-sulfonic acid piperidide,
(4-methyl-piperazino)-sulfonic acid pyrrolidide,
(4-methyl-piperazino)-sulfonic acid morpholide, and their salts.

The new piperazino-sulfonamides are obtained when a halide, preferably the chloride, of a sulfamic acid whose amide nitrogen atom is disubstituted by an alkylene radical which may be interrupted by oxygen is reacted with a 1-unsubstituted 4-alkylpiperazine.

The above-mentioned reaction can be performed in the presence or absence of solvents or diluents, for example hydrocarbons such as benzene or toluene, ethers such as diethyl ether, dioxan or tetrahydrofuran, if desired alkanols such as methanol or ethanol, or of water and/or condensing agents, for example basic compounds, for example tertiary amines such as trimethylamine, triethylamine or pyridine, or of carbonates of alkali or alkaline earth metals such as sodium carbonate, potassium carbonate or calcium carbonate, at room temperature or above it, under atmospheric or superatmospheric pressure, or in the presence of an an inert gas such as nitrogen.

Depending on the reaction conditions employed the new piperazino-sulfonamides are obtained in the free state or in the form of their salts. Salts can be converted into the free amines in known manner, for example by treatment with an alkaline agent, such as an alkali metal hydroxide or with an ion-exchanger resin. From the free bases it is possible to prepare with inorganic or organic acids therapeutically useful acid-addition salts, for example those of the hydrohalic such as hydrochloric or hydrobromic acid, a sulfuric or phosphoric acid, nitric, formic, acetic, propionic, glycollic, lactic, pyruvic, oxalic, malonic, succinic, maleic, hydroxymaleic, dihydroxymaleic, fumaric, malic, tartaric, citric, benzoic, cinnamic, mandelic, salicylic, 4-aminosalicylic, 4-phenoxybenzoic, 2-acetoxybenzoic or nicotinic acid, or with organic sulfonic acids such as methanesulfonic, ethanesulfonic, 2-hydroxyethanesulfonic, benzenesulfonic or para-toluenesulfonic acid.

The salts of the new compounds may also be used for purifying the resulting free bases; thus, the free compounds are converted into salts, the latter separated and the free bases then liberated from the salts.

The invention further includes any variant of the present process in which an intermediate obtained at any stage of the process is used as starting material and the remaining step or steps is/are carried out, or in which the starting materials are formed in the course of a reaction or are used in the form of salts thereof.

For the above processes such derivatives of the starting materials may also be used as are converted into the aforementioned starting materials under the reaction conditions.

The starting materials are known or, insofar as they are new, they can be prepared in known manner.

The new compounds may be used, for example, in the form of pharmaceutical preparations containing said compounds in conjunction with a pharmaceutical organic or inorganic, solid or liquid vehicle suitable for enteral, for example oral, or parenteral administration. Suitable vehicles are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees or capsules, or in liquid form solutions, suspensions or emulsions.

They may be sterilized and/or contain auxiliaries, such as preserving, stabilizing, wetting or emulsifying agents, salts for varying the osmotic pressure or buffers. They may also contain other therapeutically valuable substances. The preparations are formulated in the conventional manner.

The quantity of excipient may vary within wide limits and depends chiefly on the form of administration.

The new compounds may also be used in veterinary medicine, for example in one of the forms mentioned above or in the form of an additive to animal feed, for example the usual filler or diluent and feed being used.

The new compounds may also be admixed with animal fodder or used in conjunction with the conventional extenders and diluents as additives to animal fodder.

The following examples illustrate the invention.

*Example 1*

A solution of 18.4 grams of piperidino-sulfonyl-chloride in 100 cc. of absolute benzene is stirred dropwise within 15 minutes into a solution of 10.0 grams of 1-methyl-piperazine and 25 cc. of triethylamine in 100 cc. of absolute benzene. The whole is then raised to the boil while being refluxed and stirred on for 3 hours. The reaction mixture is left to itself overnight, the precipitated triethylamine hydrochloride is filtered off, and the filtrate is evaporated to dryness. (4-methyl-piperazino)-sulfonic acid piperidide of the formula

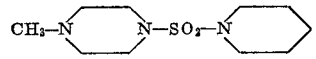

forms a brownish oil obtained in quantitative yield. The hydrochloride of this base is prepared in the following manner: A solution of the base in ethyl acetate is mixed with the calculated amount of alcoholic hydrochloric acid, whereupon the hydrochloride crystallizes out directly. After having been recrystallized from isopropanol it melts at 217–218° C.

*Example 2*

When 17.0 grams of pyrrolidino-sulfonylchloride are worked up as described in Example 1, there is obtained the (4-methyl-piperazino)-sulfonic acid pyrrolidide of the formula

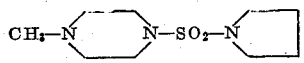

Its hydrochloride melts at 200–202° C.

*Example 3*

When 18.6 grams of morpholino-sulfonylchloride are reacted with 10.0 grams of 1-methylpiperazine as described in Example 1, there is obtained the (4-methyl-piperazino)-sulfonic acid morpholide of the formula

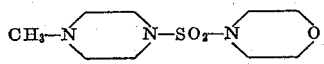

Its hydrochloride melts at 175–177° C.

What is claimed is:

1. A member selected from the group consisting of a compound of the formula

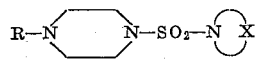

in which R represents lower alkyl and

represents a member selected from the group consisting of lower alkyleneimino and lower mono-oxaalkyleneimino and acid addition salts thereof.

2. A compound of the formula

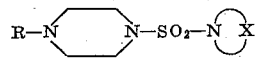

in which R represents alkyl containing 1 to 4 carbon atoms and

represents alkyleneimino having 5 to 6 ring members.

3. An acid addition salt of a compound claimed in claim 2.

4. A compound of the formula

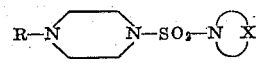

in which R represents alkyl containing 1 to 4 carbon atoms and

represents mono-oxaalkyleneimino having 5 to 6 ring members.

5. An acid addition salt of a compound claimed in claim 4.

6. A piperazino-sulfonamide of the formula

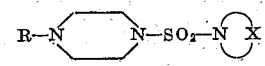

in which R represents alkyl containing 1 to 4 carbon atoms and

represents a member selected from the group consisting of pyrrolidino, piperidino and morpholino.

7. An acid addition salt of a compound claimed in claim 6.

8. (4-methyl-piperazino)-sulfonic acid piperidide.

9. An acid addition salt of the compound claimed in claim 8.

10. (4-methyl-piperazino)-sulfonic acid pyrrolidide.

11. An acid addition salt of the compound claimed in claim 10.

12. (4 - methyl - piperazino)-sulfonic acid morpholide.

13. An acid addition salt of the compound claimed in claim 12.

14. A composition comprising essentially (1) an animal feed and (2) as an anthelmintically active ingredient thereof, a member selected from the group consisting of a compound of the formula

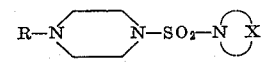

in which R represents lower alkyl and

represents a member selected from the group consisting of lower alkyleneimino and lower mono-oxaalkyleneimino and acid addition salts thereof.

15. A composition comprising essentially (1) an animal feed additive and (2) as an anthelmintically active ingredient thereof, a member selected from the group consisting of a compound of the formula

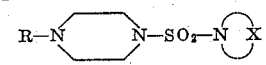

in which R represents lower alkyl and

represents a member selected from the group consisting of lower alkyleneimino and lower mono-oxaalkyleneimino and acid addition salts thereof.

References Cited by the Examiner

UNITED STATES PATENTS

| | | | |
|---|---|---|---|
| 2,748,125 | 5/56 | Hofmann | 260—268 X |
| 2,748,129 | 5/56 | Hofmann | 260—268 X |
| 2,928,767 | 3/60 | Gulesich et al. | 167—53.1 X |
| 2,944,054 | 7/60 | Gordon | 260—268 X |
| 2,945,834 | 7/60 | Coulter et al. | |
| 3,001,992 | 9/61 | Bellamy et al. | 167—53.1 X |

FOREIGN PATENTS 808,431   2/59   Great Britain.

OTHER REFERENCES

Craig et al.: "Process in Drug Research," vol. 3, pp. 116–150 (1961).

NICHOLAS S. RIZZO, *Primary Examiner.*